United States Patent [19]

Iyengar

[11] 4,383,843
[45] May 17, 1983

[54] METHODS OF AND APPARATUS FOR HEATING A PREFORM FROM WHICH LIGHTGUIDE FIBER IS DRAWN

[75] Inventor: Rama Iyengar, Lilburn, Ga.

[73] Assignee: Western Electric Company, Inc., New York, N.Y.

[21] Appl. No.: 302,933

[22] Filed: Sep. 16, 1981

[51] Int. Cl.³ ............................................ C03B 37/025
[52] U.S. Cl. ............................................ 65/2; 65/12; 65/13
[58] Field of Search ..................... 65/2, 3.11, 12, 13, 65/120

[56] References Cited

U.S. PATENT DOCUMENTS

| | | | |
|---|---|---|---|
| 2,982,991 | 5/1961 | Karlovitz | 65/13 |
| 3,125,428 | 3/1964 | Maczka | 65/13 X |
| 3,224,840 | 12/1965 | Lefever | 65/120 X |
| 3,652,248 | 3/1972 | Loxley et al. | 65/12 X |
| 4,154,592 | 5/1979 | Bailey | 65/2 |
| 4,204,852 | 5/1980 | Watts et al. | 65/12 X |
| 4,231,777 | 11/1980 | Lynch et al. | 65/2 X |
| 4,249,925 | 2/1981 | Kawashima et al. | 65/13 X |
| 4,251,250 | 2/1981 | Aulich et al. | 65/2 |

FOREIGN PATENT DOCUMENTS 137240 10/1966 U.S.S.R. .................................. 65/13

OTHER PUBLICATIONS

Smithgall et al., "Drawing Lightguide Fiber," *Western Electric Engineer*, Winter 1980, vol. 24, No. 1, pp. 49–61.

*Primary Examiner*—Richard V. Fisher
*Attorney, Agent, or Firm*—E. W. Somers

[57] ABSTRACT

Apparatus for heating a vertically suspended preform from which lightguide fiber is drawn includes a torch having a plurality of ducts that open to a surface adjacent to a lower end of the preform. Fuel and oxidizing gases flow from the ducts, mix at the surface and flame about a necked-down, lower portion of the preform to form a melt cone from which the fiber is drawn. The ducts and the preform are positioned to cause a combustion zone of each flame to impinge upon the preform. In a preferred embodiment, the openings of the ducts are arrayed in a circle which is referred to as a pitch circle and which has a diameter that is less than that of the preform. Also, the ducts are arranged so that the gases are directed at a predetermined angle to the axis of the preform.

20 Claims, 8 Drawing Figures

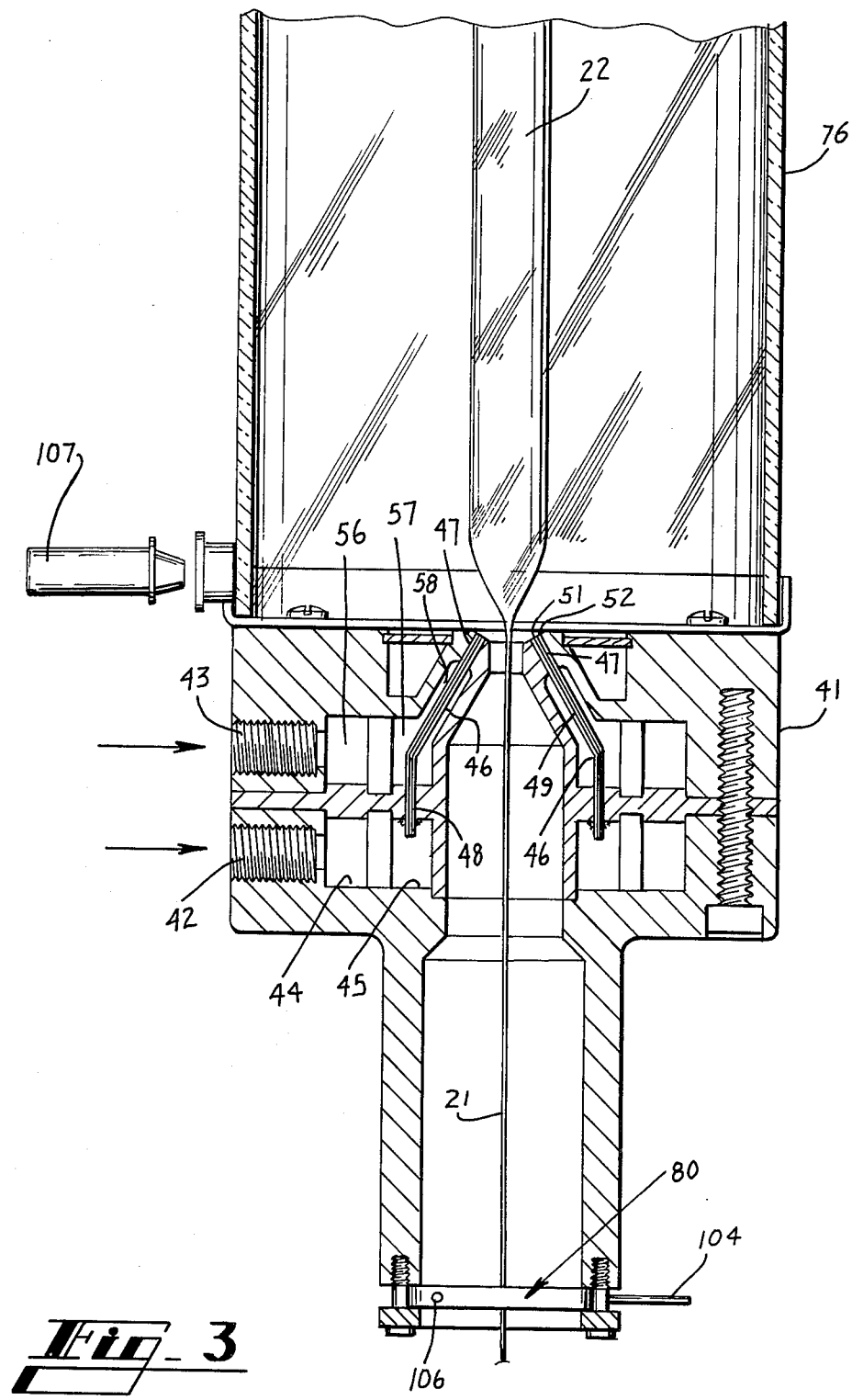
Fig_3

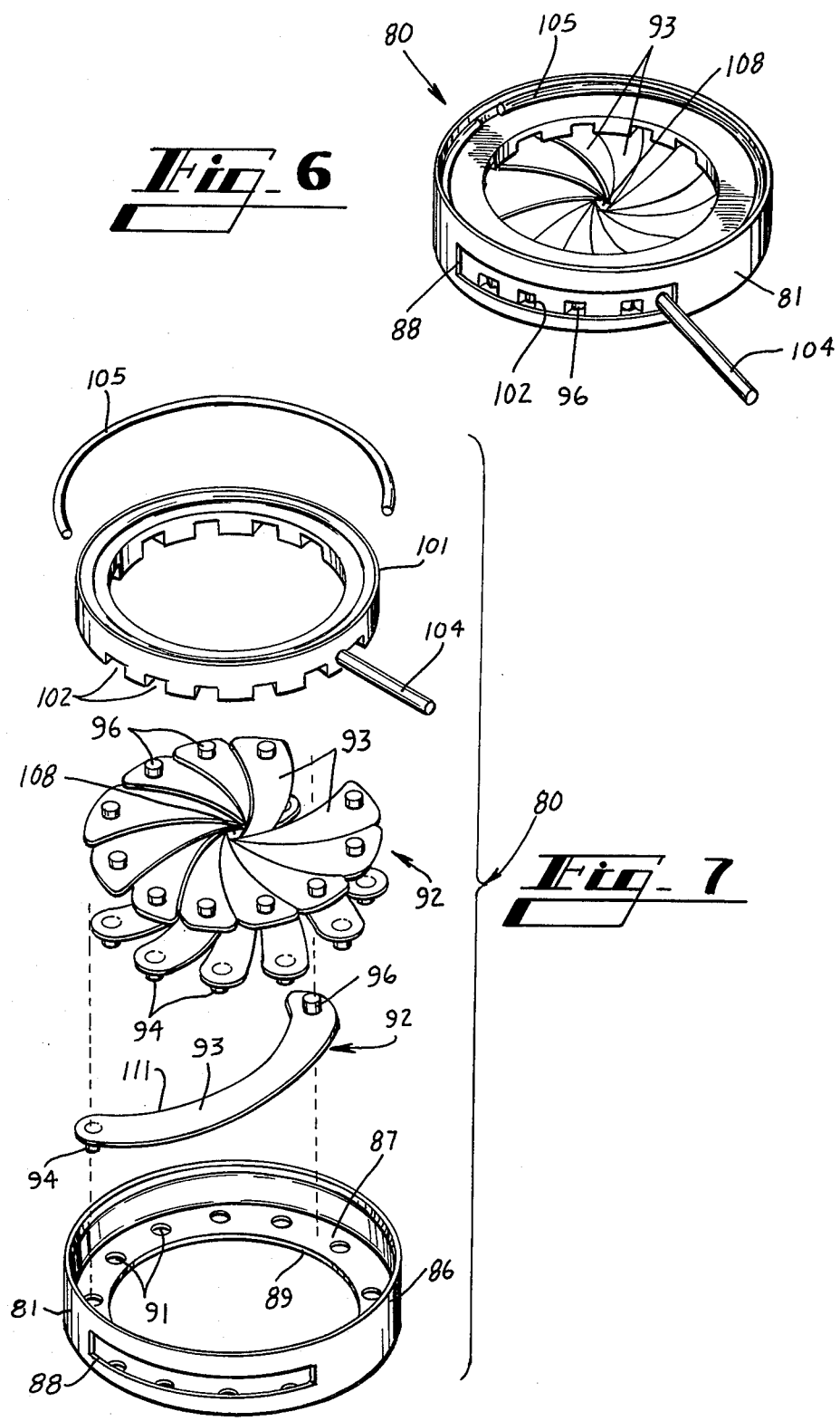

METHODS OF AND APPARATUS FOR HEATING A PREFORM FROM WHICH LIGHTGUIDE FIBER IS DRAWN

TECHNICAL FIELD

This invention relates to methods of and apparatus for heating a preform and, more particularly, to methods of and apparatus for heating a glass preform to facilitate the drawing of lightguide fiber therefrom.

BACKGROUND OF THE INVENTION

Lightguide fiber is generally formed by locally and symmetrically heating a cylindrical silica glass rod which is called a preform. Typically, the preform is 7 to 25 mm in diameter and 100 cm in length and is heated to temperatures in excess of 2000° C. As the preform is fed into a hot zone, fiber is drawn from the molten material, yielding a substantial replica of the preform cross-section.

Due to the temperatures involved and to avoid potential damage to the fiber surface, fiber cannot be drawn through a die. Consequently, the surface of the molten material is a free boundary whose shape is determined by a balance between viscous forces of the glass material, surface tension and shear forces.

When the glass is in a molten state, it is susceptible to mechanical, accoustical and thermally-induced disturbances and also to variations in diameter which occur while the process approaches its equilibrium state. An additional source of variation which is of a slowly varying nature results from changes in the preform diameter.

In a draw system which is well-known in the industry, the preform is fed into a heating zone where it is necked-down in a melt cone to the fiber size to permit fiber to be pulled from it. The diameter is measured at a point shortly after the fiber is formed, and its measured value is provided as an input to a control system. Within the control system, the measured fiber diameter is compared to a desired value and an output signal is generated to adjust the draw speed, if necessary, to correct the diameter. After the fiber diameter is measured, a protective coating is applied and is cured. Afterwards, the coated fiber is spooled for testing and storage prior to subsequent cabling operations. See the *Western Electric Engineer*, Winter 1980 issue, article beginning on page 49.

During the fiber drawing process, particles of dust and dirt can pass from the heating zone to the glass preform into the fiber surface. As a result, the tensile strength of the fiber is reduced considerably and attenuation is increased. A discussion of these problems is contained in an article by H. Aulich et al "Preparation of Optical Fibers of High Tensile Strength", Siemens Forschungs-Und Entwicklungsperreicht, Volume 7, No. 3, 1978 pps. 165–168.

Four types of heat sources have been used in an apparatus for drawing lightguide fiber, the simplest of which is an oxygen-hydrogen burner which is called a torch. In one configuration, a plurality of torches are directed toward the preform. The torch approach is clean in that there are no contaminants in the vicinity of the molten glass, but variations in the fiber diameter may occur due to the turbulence of the torch flame and the open environment surrounding the necked portion. In use of the torch, the primary mode of heating is by conduction from the flame to the glass. Because of the non-contaminating character of the torches, the fibers produced have been, in general, stronger than those produced with electrical furnaces. In addition, the string up in these kinds of heat sources is relatively simple to accomplish and they do not require purge gasses nor the consumption of energy during periods of non-use. Also, the melt cone of the preform is easy to observe and to control.

Diameter control when using a torch to heat a preform has been a problem also because of the manner in which the flames have been applied. The flames of the torch have temperature regions or zones which vary within relatively short distances. In torch heating, fuel and oxidizing gases emerge from supply ducts to create a flame having three somewhat distinct zones. First, in order from a nozzle of the torch, there is the mixing or precombustion zone, followed by a combustion zone which is the hottest part of the flame. The last or outer zone in which the combustible gases mix with outside air is called a plume and is a zone of unsteady temperatures. It has been typical in the prior art for the torch to be positioned so that the target surface which is to be heated lies generally in the plume of the torch flame. This contributes to the nonuniformity of the temperature. Multi-nozzle torches called ring burners in which the nozzles are directed radially have been tried, but have not produced uniform temperature fields because the gases emerging from one nozzle interact with with those of the radially opposed nozzle thereby causing variability.

Some routineers have used an arrangement of only two nozzles, but then, in order to distribute the heat uniformly about the preform, the preform must be rotated. Since preforms are not perfectly straight, the rotation causes the preform to wander into and out of different temperature fields causing diameter fluctuation.

There is also another problem with respect to the ring type burner. Generally, as soon as the melt cone begins to form, the distances from the torches of the ring burner to the preform are somewhat distorted from those distances at the outset. Undesirably, once the distances are set and those distances are distorted because of the melt cone, design parameters can become changed.

A second heat source which is also very clean is a laser. By the use of a rotating lens or scanning galvanometers, the laser's energy is distributed uniformly about the preform. The energy is absorbed by the surface of the preform and the interior is heated by conduction. The laser is a clean energy source since the environment surrounding the molten glass is independent of the laser. Although diameter variation is much lower than that achieved with torches, the molten glass is subject to convection disturbances. While the laser has proven to be a useful laboratory tool, other sources offer nearly the same cleanliness, better environmental control, and much lower investment and operating costs.

The other two sources which have been used are furnaces, which differ significantly in interval construction. A graphite furnace uses a graphite ring which is heated resistively or inductively to heat the preform by radiation. At elevated temperatures, though, graphite reacts readily with oxygen, and must be surrounded by flowing a protective gas such as argon or nitrogen into the furnace. The flow of gas must be carefully controlled to prevent disturbances to the necked-down molten glass region. In addition, due to the high operating temperature of the furnace elements, there is a risk of contamination of the preform and consequently, reduced fiber strength.

An alternate furnace design uses zirconia rings, which are RF inductively heated, to heat the preform by convection and radiation. This furnace configuration has the advantage that zirconia does not require a protective inert atmosphere, and consequently the preform may be drawn in a relatively quiescent environment without the expense of a protective gas.

Problems have been encountered with the zirconia furnace. It has been found that insulation material therein generates particulate matter. Should this matter contact a fiber which is being drawn, it causes flaws and weakens the fiber. Also, it has been found that a substantial percent of fiber breaks during proof testing are caused by particulate matter induced flaws. It should be apparent that a desirable heat source is one which does not contaminate the glass.

Cost is also another factor that makes the zirconia furnace not altogether desirable. Once it is brought up to an operating temperature above 1900° C., the muffle tube thereof which is formed by zirconia rings called elements cracks if it is cooled down. As a result of its sensitivity to thermal shock, the zirconia furnace must remain at an elevated temperature thereby increasing energy consumption. Moreover, if the preform were to touch a zirconia element, it would become adhered thereto, terminating the life of the element.

From the foregoing discussion, it should be apparent that a torch arrangement offers inumerable advantages over the other identified heat sources. A torch arrangement provides a much cleaner environment of heat than a furnace. The water vapor product of combustion does not condense at the high temperatures. As a result, particulate matter is not deposited in the surface of the preform and the product fiber has a higher strength. However, what is needed and what the prior art seemingly does not provide is a torch arrangement with all its attendant advantages and yet one which allows suitable control of the diameter of the drawn lightguide fiber.

SUMMARY OF THE INVENTION

The foregoing needs have been met by the methods and the apparatus of this invention for heating a glass preform from which lightguide fiber is drawn. A glass preform having a necked-down portion is supported with its axis oriented vertically and with its necked-down portion at its lower end. Then a plurality of flames are directed toward a target surface of the necked-down portion at a predetermined angle to the axis of the preform. Each of the flames includes a precombustion zone, a combustion zone and a plume. The target surface and the flames are positioned to cause the target surface to be engaged about its periphery by the combustion zone of each flame. The glass preform is moved downwardly as its lower end is heated by the flames while lightguide fiber is drawn from the necked-down portion.

In a preferred embodiment, a ring of nozzles of a torch are positioned below the lower necked-down end portion of a preform which is suspended vertically. Fuel and oxidizing gases such as hydrogen and oxygen gases, for example, are caused to flow through the nozzles and surrounding passageways to produce flames which impinge on the necked-down portion of the preform. The ring is dimensioned so that the diameter of a circle which includes tips of the nozzles is smaller than the diameter of a central portion of the preform. As a result, the surface which is subjected to the flames is held at a distance from the tips of the nozzles to cause it to be contacted by the highest temperature zones of the flames which are the combustion zones. In the preferred embodiment of the torch of this invention, oxygen and hydrogen gases are flowed through portions of the torch housing and are mixed externally of a surface to which the nozzles and passageways open.

Other features of the invention include a shield which circumscribes the necked-down portion of the preform to provide a quiescent heating zone. Also, an iris die is provided at a lower end of the heating zone to prevent an updraft of atmospheric air which could affect the drawing process.

BRIEF DESCRIPTION OF THE DRAWINGS

Other features of the present invention will be more readily understood from the following detailed description of specific embodiments thereof when read in conjunction with the accompanying drawings, in which:

FIG. 3 is an elevational view, partially in section and taken along lines 3—3 of FIG. 2, of an apparatus of this invention for heating the preform;

FIGS. 6–7 are perspective and exploded views of the iris diaphragm.

DETAILED DESCRIPTION

Figures 1, 4A, 4B:
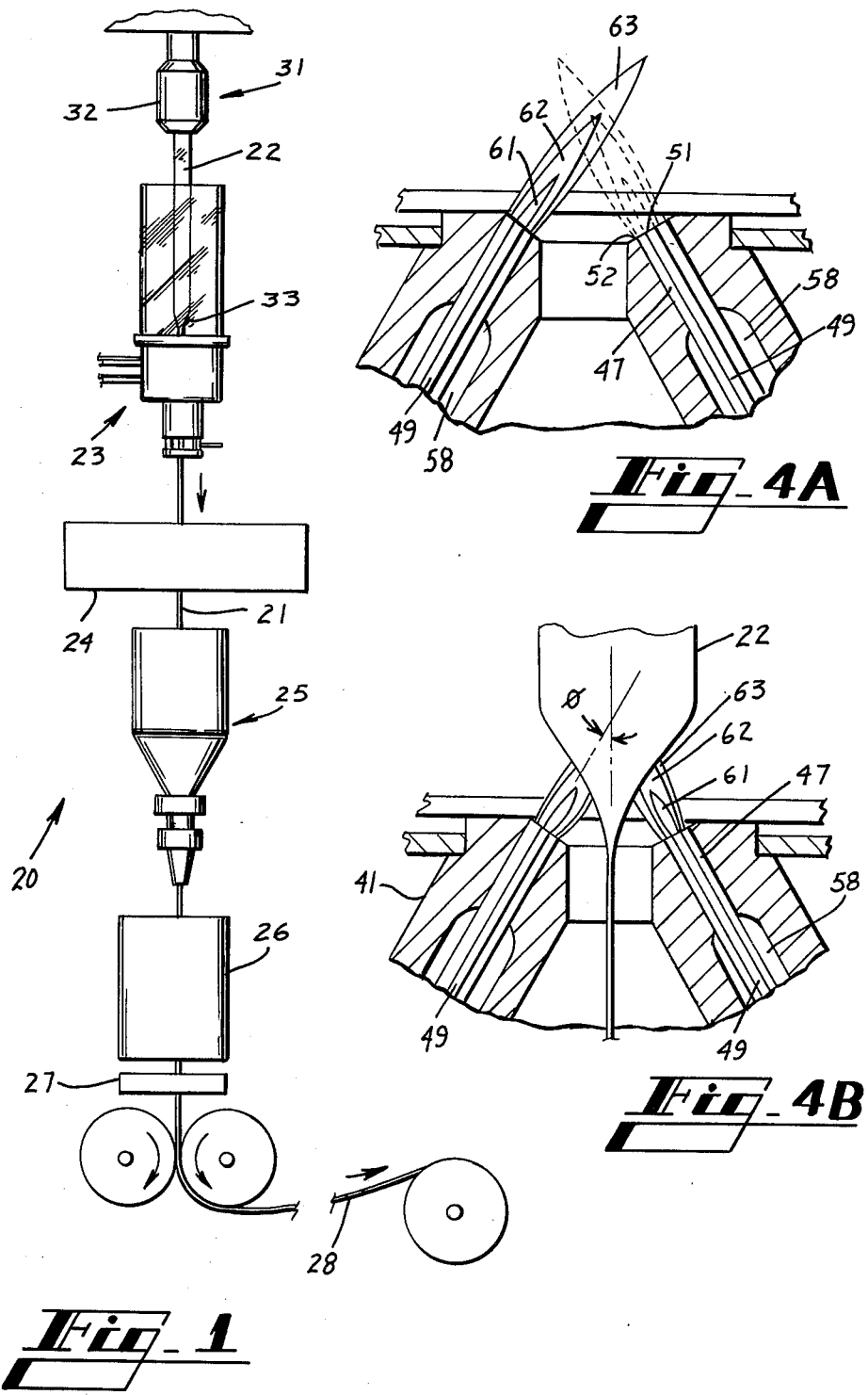
FIG. 1 is an overall view of an apparatus of this invention for heating a glass preform from which lightguide fiber is drawn.
FIGS. 4A and 4B are enlarged views of a portion of the apparatus of FIG. 2 to show two torch flames and their engagement with a necked-down portion of the preform.

Referring now to FIG. 1, there is shown an apparatus designated generally by the numeral 20 for drawing lightguide fiber 21 from a glass preform 22 which is suspended vertically. After the fiber 21 has been drawn through a heating apparatus designated generally by the numeral 23, its diameter is measured by a device 24, coated by a device 25 and then treated in a chamber 26. The diameter of the coated fiber 28 is measured before it is taken up. All these operations are well-known and are discussed at length in the hereinbefore-identified Winter 1980 issue of the *Western Electric Engineer.*

As can be seen from the drawings, the apparatus 20 includes means 31 including a chuck 32 for suspending the preform 22. The means 31 also includes facilities for feeding the preform 22 downwardly to position a depending end 33 thereof in the vicinity of the apparatus 23 which is used to heat the preform and allow the fiber 21 to be drawn therefrom.

Figure 2:
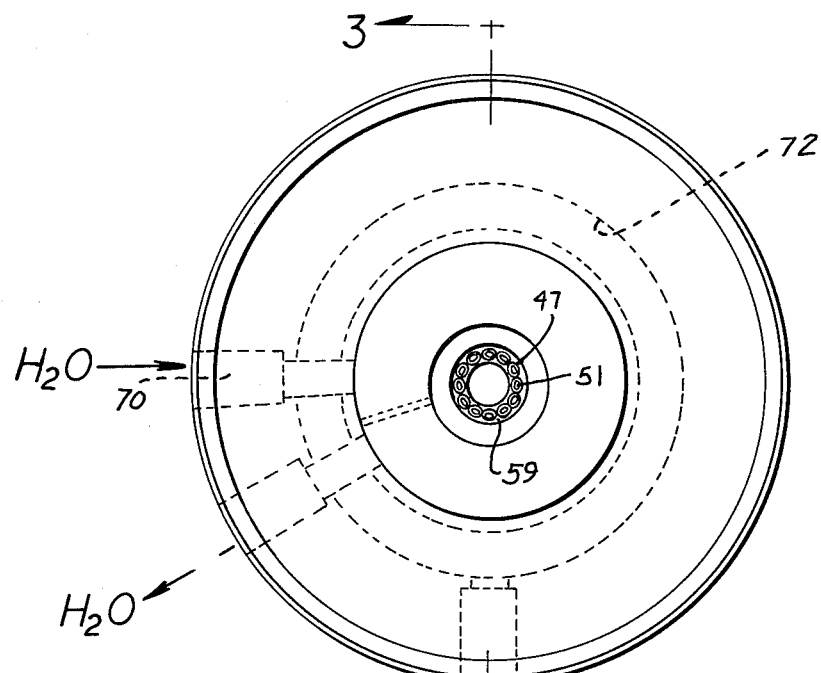
FIG. 2 is a plan view of the apparatus of this invention to show a ring of burners.
Figure 5:
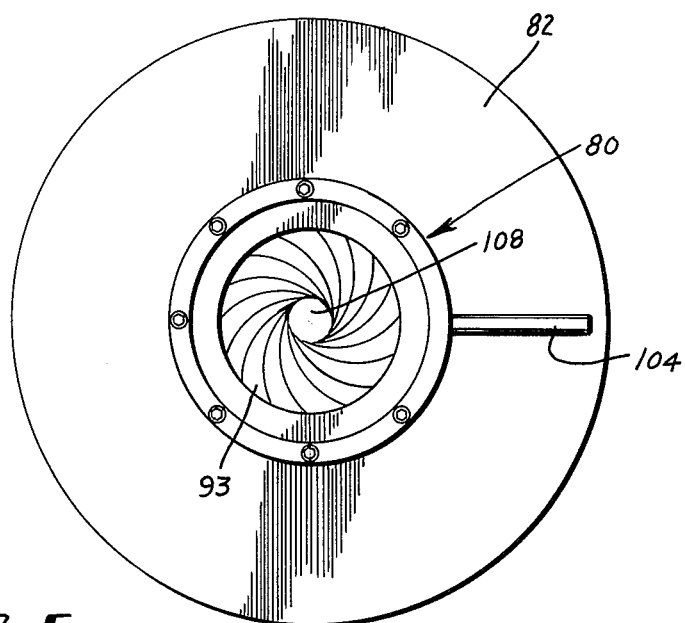
FIG. 5 is a plan view in section which shows an iris diaphragm that is mounted at a lower end of the heating apparatus.

Going now to FIGS. 2–3, it is seen that apparatus 23 includes a housing 41 having an inlet 42 for a fuel gas from a supply and an inlet 43 for an oxidizing gas. In a preferred embodiment, the fuel gas is hydrogen and the oxidizing gas is oxygen. The gases are flowed through a system of ducts to the vicinity of the preform.

The inlet 42 communicates with a cavity 44 and an annular chamber 45. From the chamber 45, a plurality of tubes 46-46 which terminate in burners or nozzles 47-47 extend upwardly and are attached to the housing 41. The tubes 46-46 open to the supply chamber 45 to which is supplied the hydrogen gas. Each of the tubes 46-46 comprises a linear portion 48 which is generally parallel to the axis of the preform 22 and an upper linear portion 49 which is directed inwardly at an angle $\phi$ to the preform axis. Each of the nozzles 47-47 has an orifice 51 which is referred to as a burner tip and which opens to a surface 52. Although only one ring of nozzles 47-47 is shown, it should be apparent that two or more could be used as required in particular embodiments.

As for the inlet 43, it communicates with a cavity 56 and then with an annular chamber 57. The annular chamber 57 communicates with a cavity 58 which extends upwardly and opens to the surface 52 of the housing 41. The nozzles 47-47 are received in the cavity 58, but because of their configuration, passageways 59-59 (see FIG. 2) for the flow of oxygen are formed between them and the walls of the cavity.

The nozzles 47-47 and the passageways 59-59 therebetween are arranged so that the velocities of the oxygen and hydrogen gases are equalized. This is accomplished by making the total area through which the hydrogen flows about twice that through which the oxygen flows. The control of the ratio of the gases and their velocities prevents excessive wear of the nozzle walls and the preform 22. This arrangement also results in causing the volume of hydrogen which flows through the nozzles 47-47 to be about twice that of the oxygen which flows through the passageways 59-59.

The oxygen and the hydrogen gases are moved through the nozzles 47-47 and the passageways 59-59 and are mixed generally along the top surface 52 of the housing 41. They produce a flame which impinges on the preform 22. An advantage of the surface mix design is its ability to produce a so-called "soft" flame. This reduces the impact of the gases on the preform 22 and avoids abrasion of the surface of the preform.

A surface mix design is also beneficial from another standpoint. With a premix burner design, silica vapors condense at the bottoms of the orifices and slowly grow toward the melt cone. After this growth attains a particular size, it disturbs the flame. Although a gas curtain could be used to shield each orifice to prevent silica deposits, such a shield will also disturb the flame. This problem is overcome by using a surface mix torch in which hydrogen and oxygen gases are flowed through separate ducts and mix adjacent to the external surface 52.

An understanding of flame technology has resulted in a torch arrangement which is a solution to many of the hereinbefore discussed problems. The flame is produced by the ignition of a fuel gas with an oxidizing gas. At first, these two gases require a mixing time prior to ignition and require a threshold temperature for ignition.

A flame includes three zones—a precombustion zone 61 (see FIG. 4), a combustion zone 62 and a plume 63 in order from a point where gases which combust to produce the flame come together. The threshold temperature for ignition is a function of the gases to be ignited as is the length of the precombustion zone. The length of the combustion zone is a function of the velocity of the gases and the diameters of the orifices. The precombustion zone occurs not only in surface mix torches where the fuel and oxidizing gases mix, such as at the surface 52 to which carrier ducts for the gases open, but also in premix torches. When a premixed gas emerges from its passageway, there is a distinct precombustion zone prior to ignition.

Velocities of the gases are also important. When the gases ignite, expansion of the gases accompanies the ignition. There is a flame front which travels toward the nozzle tip 51. The orifices are sized and the supply means is designed to cause the velocities of the gases exiting from the tips 51-51 to exceed that of the flame front. This prevents any runback into the nozzles 47-47 and assures the presence of a precombustion zone outside the tips 51-51. In the surface mix torch, this problem is not as acute because the fuel and oxidizing gases require a greater travel prior to ignition than in the premix arrangement.

The heating arrangement of this invention is advantageous from several standpoints and optimizes the use of flames to heat the preform. Advantageously, and as can best be seen in FIGS. 3 and 4, the arrangement causes the hottest point of the flame to engage the target surface of the preform 22, i.e., the lowermost portion of the vertically suspended preform. In the prior art, a relatively large pitch circle in which the torch burner tips were disposed is used to allow the boule of the preform to pass through. In the inventive arrangement, the pitch circle diameter is somewhat less than the preform diameter which insures the optimum positioning of the target surface with respect to the flames. For example, in order to draw fiber from a 13 mm diameter preform, the pitch circle diameter is about 10 mm. This arrangement positions the target, i.e. the preform 22 within the hottest point of the torch flame, yet still allows the fiber to be pulled through the pitch ring by a slender rod that is moved into a lower end of the housing 41 and welded to the lower end of the preform.

Although in the preferred embodiment, the burner tips 51-51 are arranged in a pitch circle having a diameter that is less than that of the preform 22, there may be instances when it is not. In those instances, the target surface may be in the combustion zone of the flames at the outset, but because of subsquent meniscus drag on the preform, care must be taken to prevent the preform from being positioned in the plume. Advantageously, the preferred embodiment is designed for the steady state condition of the drawing operation and avoids that problem.

Another important consideration is the angle which the axes of the nozzles 47-47 make with the centerline of the preform 22. If the nozzles 47-47 are parallel to the preform axis, the flames would extend too far. Also, the melt cone of the preform could not be controlled and it would elongate and prevent control of the fiber diameter. On the other hand, if the draw cone angle is too shallow, the material of the preform passes from the solid to the molten state in a relatively short period of time. Also, in that arrangement, with the nozzles directed radially inwardly, a flame abutment problem arises. The turbulence of the gases of one nozzle 47 interacts with that of a radially opposed nozzle and renders the temperature field unstable. Desirably, the angle $\phi$ between the torch and a vertical axis should be in the range of 10° to 50° and in a preferred embodiment is 30°. Advantageously with the apparatus of this invention, the cone of heat is above the nozzles 47-47 and as a result, the preform does not engage the nozzles.

It is also important to cool the housing 41 and the walls of the nozzles 47-47 in order to provide a clean gas which prevents oxidation and resulting flaking of the material of which they are made. Chilled water is fed through an inlet 70 to be circulated around a channel 72 which is adjacent to the surface 52 and to the passageways 59-59. The coolant is effective to cool the housing 41 and to cause a secondary cooling of the nozzles by conduction. The nozzles 47-47 are cooled primarily by the combustible gases which flow through the nozzles and the passageways 59-59. The cooling prevents oxidation of portions of the housing and of the nozzles 47-47 which otherwise could result in minute particles of oxidized metal being carried along in gaseous streams and contaminating the preform 22. Also, the top surface of the housing 41 is cooled.

Not only is the arrangement of the pitch ring of the nozzles 47-47 and their angle of incidence important, but also control must be exercised to prevent disturbance of the flames. One of the advantages of a quiescent furnace is that the air therein is still which facilitates diameter control. This is accomplished in two ways. First, a shield 76 is attached to the housing 41 and extends upwardly therefrom. This surrounds the pitch ring and prevents direct disturbance of the flames.

The impact of gases on the preform 22 creates a positive pressure zone which passes downwardly. This flow opposes an updraft through the lower end of the furnace if it is open. If left unabated, the cold outside air of the updraft would result in uneven temperature fields. To overcome this, a second feature for preventing flame disturbance includes an adjustable opening which is positioned at the lower end of the apparatus 23 and which when closed reduces the updraft and causes the heat zone to remain at an elevated temperature. The arrangement of this invention is of great help in controlling the stability of the flames.

This capability is accomplished by means of a device which is designated generally by the numeral 80 (see FIGS. 1 and 5-7). That device is basically an iris diaphragm which is mounted in a ring holder 81 and which is supported in a lower portion of the housing 41. The ring holder 81 is maintained in a desired circumferential position by a plurality of fasteners 82-82 which are turned threadably through openings in a lower portion of the housing 41.

Going now to FIGS. 6 and 7, the construction of the iris diaphragm 80 is shown. As can be seen, the diaphragm 80 includes a base ring 86 which includes an annular portion 87 having a wall 88 extending upwardly from a periphery of the annular member 86. The annular member includes a central disposed opening 89 and a plurality of smaller openings 91 which are spaced apart within the annular portion 87.

The iris diaphragm 80 is designed so that a portion of the opening 89 is designed to be restricted or expanded at the instance of an operator or by a feedback control system. As can be seen from the drawings, a plurality of diaphragm leaves 92-92 are mounted on the annular portion 87. Each of the diaphragm leaves 92-92 includes an arcuate portion 93 having pins 94 and 96 of relatively small height protruding in opposite directions from the ends thereof. Each of the leaves 92-92 is positioned on the annular portion 87 so that the pin 94 at one end thereof is received in one of the openings 91. In this way, the pin 96 at the other end of each one of the diaphragm leaves 92-92 extends upwardly from the annular portion 87 and these are spaced about a circle above the annular portion.

To complete the diaphragm 80, a second annular member 101 having a plurality of radially formed slots 102-102 therein is mounted in the base ring 86 above the diaphragm leaves 92-92. The second annular member 101 is positioned above the diaphragm leaves 92-92 such that the second pin 96 of each one of the leaves is received in an associated one of the slots 102-102 formed in the second annular member. Further, the second annular member 101 has an actuating lever 104 extending radially therefrom. The second annular member 101 and the leaves 92-92 are held in the base ring 86 by a retention ring 105.

The diaphragm 80 is such that the leaves 92-92 are capable of being moved simultaneously to decrease or to increase the size of the orifice through which the coated fiber 21 exits the apparatus 23. When the pins 96-96 are moved arcuately in one direction to one extreme position, an opening 98 which is provided among the leaves 92-92 at the centerline of the member 101 is relatively small. At the other extreme and at positions between the two extremes reached by the movement of the pins in an opposite arcuate direction, the openings 108 (see FIGS. 6 and 7) formed along the leaves 92-92 is increased.

As can be seen in FIG. 3, the actuating lever may extend between two locking and gauging pins 106-106. The locking pins 106-106 extend through openings in ears of the housing 41. By presetting the pins 106-106, the extent to which the iris die is capable of being opened and closed is established.

In operation, the actuating lever 104 is moved pivotally in either a clockwise or counterclockwise direction and may be locked in a desired position by appropriate positioning of the pins 106-106. The movement of the lever 104 causes movement of the second annular member 101 which in turn applies forces to the second pins 96-96 of each one of the leaves 92-92. This in turn causes the leaves 92-92 to move pivotally about the first ones of the pins 94-94 of each of the leaves in order to restrict or to expand the opening 108 through the diaphragm. It should be observed that the second pin of each leaf 92 is caused to move within its associated slot 102 as the actuating lever 104 is moved. Depending on the direction of movement of the actuating lever 104, each pin is one arcuate direction or another while moving within its slot.

Heat control is relatively simple for the heating apparatus 23 of this invention. A pyrometer 107 is positioned so that it is sighted at the so-called hot spot at the lower end of the preform 22. A signal is transmitted from the pyrometer 107 to a controller (not shown) which adjusts if necessary, the amount of oxygen and hydrogen that is fed through the passageways 59-59 and the nozzles 47-47, respectively, to maintain the temperature within a narrow range. Moreover, a system is provided for the automatic centering of the preform 22 at the center of the pitch circle to insure uniformity of heat. An analog or a digital signal which is a function of the divergence from a center position is fed into a positioning device to move the preform 22, if necessary.

This arrangement is advantageous in that the pyrometer 107 is sensing the temperature of the preform 22. In the hereinbefore described zirconia furnace, the pyrometer senses the temperature of an outer surface of an element thereof. This, unlike the reading of the pyrometer in the apparatus 23 of this invention, is not necessarily an accurate indication of the temperature of the preform.

It is to be understood that the above-described arrangements are simply illustrative of the invention.

Other arrangements may be devised by those skilled in the art which will embody the principles of the invention and fall within the spirit and scope thereof.

What I claim is:

1. A method of heating a glass preform from which lightguide fiber is drawn, said method including the steps of:
    supporting the glass preform with its axis oriented vertically, the glass preform having a necked-down portion at its lower end;
    directing a plurality of flames which are arrayed in a circle that circumscribes the preform toward a target surface of the necked-down portion at a predetermined angle to the axis of the preform to heat the preform, each of the flames including a precombustion zone, a combustion zone and a plume;
    positioning the target surface and the flames to cause the target surface to be engaged about its periphery by the combustion zones of the flames; and
    moving the glass preform downwardly at its lower end is heated while drawing lightguide fiber from the necked-down portion.

2. A method of heating a glass preform from which lightguide fiber is drawn, said method including the steps of:
    supporting the glass preform with its axis oriented vertically, the glass preform having a necked-down portion at its lower end;
    directing a plurality of gases from openings of ducts toward a target surface of the necked-down portion at a predetermined angle to the axis of the preform to produce a plurality of flames, each including a precombustion zone, a combustion zone and a plume, to heat the preform,
    positioning the ducts to array the openings in a circle which circumscribes the necked-down portion of the preform and which has a diameter that is less than the diameter of the preform to cause the target surface to be engaged about its periphery by the combustion zones of the flames; and
    moving the glass preform downwardly as its lower end is heated while drawing lightguide fiber from the necked-down portion.

3. A method of heating a substantially cylindrical glass preform from which lightguide fiber is drawn, said method including the steps of:
    supporting the glass preform with its axis oriented vertically, the glass preform having a necked-down portion at its lower end;
    positioning a plurality of supply ducts about the necked-down portion of the preform with openings of the ducts being disposed in a circle that has a diameter which is less than the diameter of the preform and being disposed at a predetermined angle to the axis of the preform;
    flowing gases through the ducts and causing them to produce a flame which impinges on the preform; and
    moving the preform downwardly as its lower end is heated while drawing lightguide fiber from a lower end thereof.

4. The method of claim 3, wherein individual gases are flowed through the ducts and are mixed outside their openings to produce a flame which is associated with each duct, each flame including three zones with an intermediate one being a combustion zone and having the highest temperature of the three zones.

5. The method of claim 3, wherein hydrogen is flowed through an array of tubular members having at least portions which are directed toward the axis of the preform and oxygen is directed through passageways which are formed among the tubular members and walls of a cavity in which the tubular members are mounted, the hydrogen and oxygen being mixed to produce flames each of which is associated with a tubular member and each of which includes a precombustion zone, a combustion zone and a plume.

6. The method of claim 5, wherein the circle is such that the preform lies within said combustion zone of each flame.

7. The method of claim 6, wherein said angle at which the portions of the tubular members are angled to the preform is in the range of about 10° to 50°.

8. The method of claim 6, wherein said angle is 30°.

9. The method of claim 8, which also includes the steps of cooling the tubular members and walls of the passageways adjacent the surfaces thereof from which the gases emerge.

10. The method of claim 3, which also includes the step of controlling the movement of atmospheric air upwardly toward the circle of openings of the ducts.

11. An apparatus for heating a glass preform from which lightguide fiber is drawn, said apparatus including:
    supporting means for holding the glass preform with its axis oriented vertically, the preform having a necked-down portion at its lower end;
    duct means having ends which are arrayed in a circle that circumscribes the preform for directing a plurality of flames toward a target surface of the necked-down portion at a predetermined angle to the axis of the preform to heat the preform, each of the flames including a precombustion zone, a combustion zone and a plume;
    positioning means for causing the target surface to be engaged about its periphery by the combustion zones of the flames; and
    moving means for advancing the preform downwardly as its lower end is heated while drawing lightguide fiber from the necked-down portion.

12. An apparatus for heating a glass preform from which lightguide fiber is drawn, said apparatus including:
    supporting means for holding the glass preform with its axis oriented vertically, the preform having a necked-down portion at its lower end;
    duct means including nozzles having orifices for directing a plurality of gases toward a target surface of the necked-down portion at a predetermined angle to the axis of the preform to produce a plurality of flames to heat the preform, each of the flames including a precombustion zone, a combustion zone and a plume;
    positioning means for mounting said nozzles with said orifices arrayed in a circle which circumscribes the necked-down portion of the preform and which has a diameter that is less than the diameter of the preform to cause the target surface to be engaged about its periphery by the combustion zones of the flames; and
    moving means for advancing the preform downwardly as its lower end is heated while drawing lightguide fiber from the necked-down portion.

13. An apparatus for heating a substantially cylindrical, glass preform from which lightguide fiber is drawn, said apparatus including:
supporting means for holding the glass preform with its axis oriented vertically, the preform having a necked-down portion at its lower end;
a housing which encloses a portion of a path of the drawn fiber, said housing including duct means for directing a flow of combustible gases toward the necked-down portion of the preform with openings of said duct means from which the gases emerge therefrom being arrayed in a circle having a diameter that is less than that of the preform;
means for flowing gases through said duct means and causing them to provide flames to heat the preform; and
means for moving the preform downwardly as its lower end is heated and for drawing lightguide fiber from the lower end thereof.

14. The apparatus of claim 13, wherein said means for flowing gases which produce the flames include means for flowing a fuel and an oxidizing gas which are flowed through individual ducts which terminate in said openings, the gases being caused to mix adjacent to a surface in which said openings are formed.

15. The apparatus of claim 13, where said means for flowing includes means for directing the gases toward the preform at an angle to the axis of the preform in the range of about 10° to 50°.

16. The apparatus of claim 15, wherein the angle is 30°.

17. The apparatus of claim 13, wherein said duct means includes a plurality of nozzles each of which is received in a cavity of said housing with the axes of the nozzles being angled to the axis of the preform.

18. The apparatus of claim 17, wherein said nozzles are arranged to cause passageways to be provided among said nozzles, and wherein one gas is flowed through said nozzles and a second combustible gas is flowed through passageways between adjacent nozzles and walls of the cavity of the housing in which the nozzles are mounted.

19. The apparatus of claim 13, which also includes a shield that is mounted above said housing to protect the lower end of the preform and said circle of openings from air currents.

20. The apparatus of claim 13, which also includes a variable opening die that is mounted on said housing at a lower end thereof, said die having an opening therethrough to permit passage of the drawn fiber, said opening capable of being opened to facilitate string up of the fiber through said housing and reduced in size to prevent updraft of air currents.

* * * * *

UNITED STATES PATENT AND TRADEMARK OFFICE
CERTIFICATE OF CORRECTION

PATENT NO. : 4,383,843
DATED : May 17, 1983
INVENTOR(S) : Rama Iyengar

It is certified that error appears in the above—identified patent and that said Letters Patent is hereby corrected as shown below:

In the claims, column 9, claim 1, line 21 "at" should read --as--.

Signed and Sealed this

Twenty-seventh Day of September 1983

[SEAL]

Attest:

GERALD J. MOSSINGHOFF

Attesting Officer     Commissioner of Patents and Trademarks